United States Patent

[11] 3,540,708

[72] Inventors: William Ferguson Watson
Shrewsbury;
William George Newell, Stirchley, near
Wellington, England
[21] Appl. No. 727,796
[22] Filed May 9, 1968
[45] Patented Nov. 17, 1970
[73] Assignee Rubber and Plastics Research Association
of Great Britain
Shrewsbury, England
a British Company
[32] Priority May 10, 1967
[33] Great Britain
[31] No. 21,712/67

[54] FLUIDIZED MEANS FOR HEAT TREATMENT OF RUBBER
10 Claims, 4 Drawing Figs.

[52] U.S. Cl. .................................................. 263/21, 34/57

[51] Int. Cl. ............................................. F27b 15/00
[50] Field of Search ...................................... 34/10, 57; 263/21A, 40A; 165/104

[56] References Cited
UNITED STATES PATENTS
| | | | |
|---|---|---|---|
| 2,326,163 | 8/1943 | Patterson | 263/21 |
| 3,250,521 | 5/1966 | Sergent | 263/40A |
| 3,445,100 | 5/1969 | Bond | 263/40A |

Primary Examiner—John J. Camby
Attorney—Beveridge & DeGrandi

ABSTRACT: Curing apparatus comprising a sealed vessel having sealed inlet and outlet passages for passing material to be cured through the vessel; and valve controlled inlet and outlet passages for emitting a fluidizing medium such as steam into the vessel and for exhausting the steam from the vessel while maintaining a positive gas pressure in the vessel sufficient to prevent substantial expansion of volatiles or gases present in the material being cured.

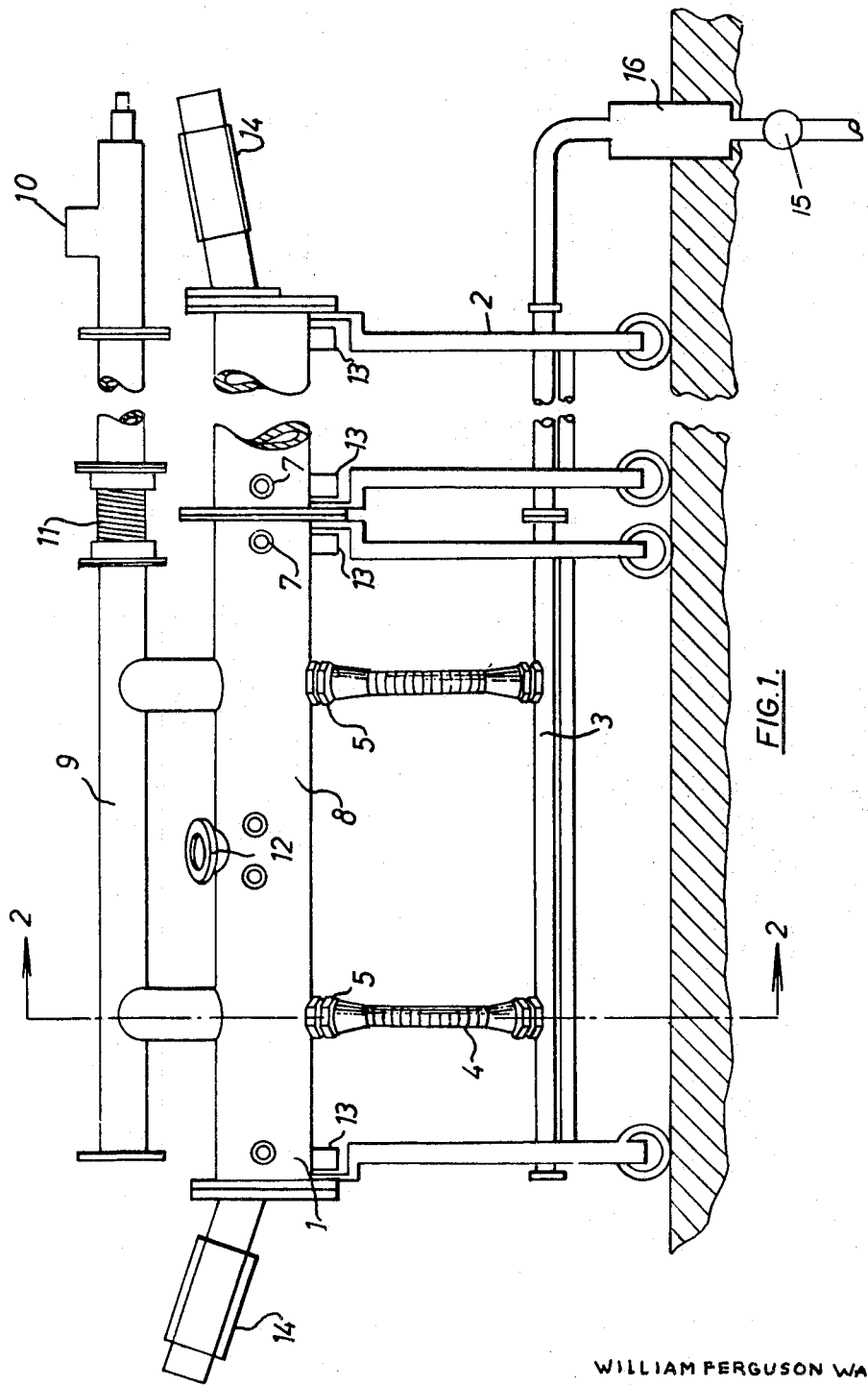

Patented Nov. 17, 1970
3,540,708
Sheet 2 of 2
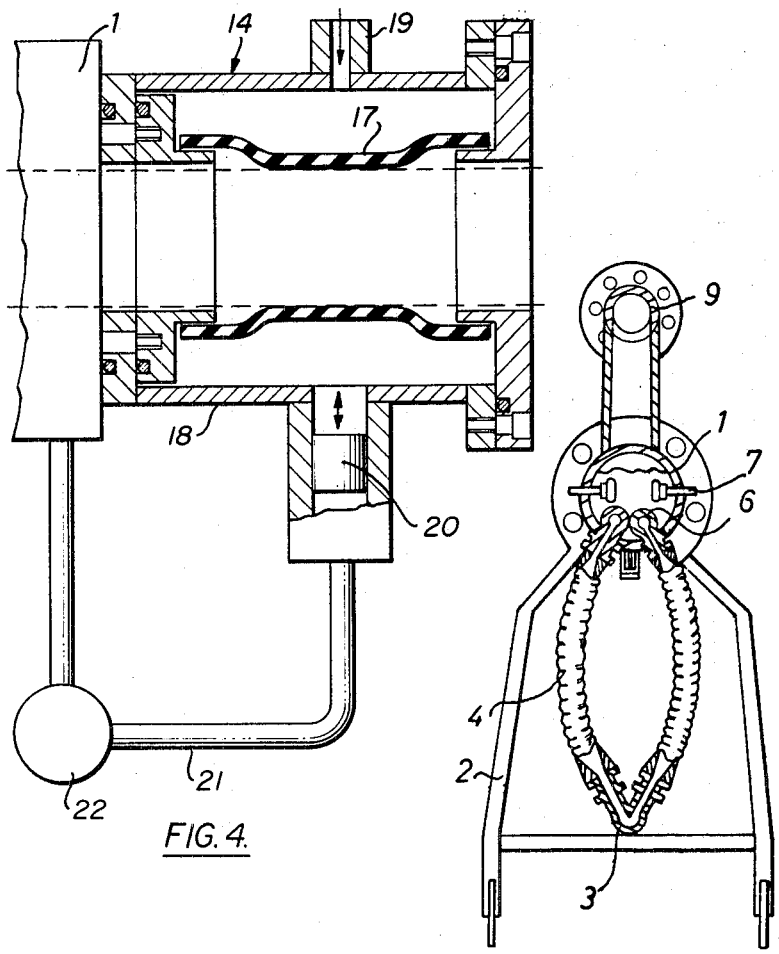
FIG. 4.
FIG. 2.
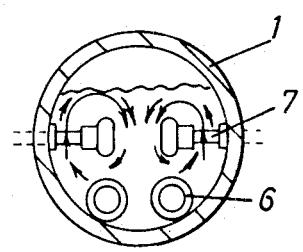
FIG. 3.
INVENTOR:
WILLIAM FERGUSON WATSON
& WILLIAM GEORGE NEWELL
BY
Browne, Schuyler & Beveridge,
Attorneys

FLUIDIZED MEANS FOR HEAT TREATMENT OF RUBBER

This invention relates to the heat treatment of rubber. By the term rubber is meant both natural and synthetic rubbers, for which heat treatment is used in processing from the raw rubber state to the finished vulcanised product. Included therefore are natural and synthetic cis-polyisoprenes, styrene-butadiene, acrylonitrilebutadiene, isobutylene-isoprene, cis-polybutadiene, polyurethane and polyether elastomers, polyethylene-propylene copolymeric elastomers, silicones and fluorinated hydrocarbon elastomers and modifications thereof such as "superior processing" natural rubber and partially vulcanised styrenebutadiene rubber.

The continuous vulcanisation of continuous extruded rubber articles by the fluidised bed process and the liquid curing medium process is now well established, and both methods are used in commercial production. In the liquid curing process, the rubber (containing additives including curing system) is extruded from an extruder, and passed into a bath of liquid at a suitable temperature, generally in the range 180° to 250°C. It vulcanises in the bath and is continuously hauled off at the end of the bath, as a cured product. One difficulty with this process has been to find a liquid suitable for use at such temperatures. Low melting point metal alloys have been used, but they are of unsuitable density and tend to leave a dross on the rubber which is difficult to remove, and the use of eutectic mixtures of molten salts has therefore been preferred. These salts are, however, potentially dangerous, and personnel employed on liquid bath curing processes must be suitable protected by safety clothing. The fluidised bed process, as proposed in British Pat. No. 906,139, overcomes this difficulty by employing a bed of gas-fluidised particles of an inert material such as sand or glass which acts as an inert "pseudoliquid".

Both of these processes, as conventionally operated, suffer from the disadvantage that when vulcanisation takes place, any volatiles in the rubber will tend to volatilise and expand rapidly, causing undesirable porosity in the rubber at the temperatures involved. Care can be taken to ensure that volatile compounding ingredients e.g. volatile plasticisers, are not employed, but a certain amount of moisture always appears to be present in rubber, and air frequently becomes included during processing operations (e.g. in the extruder). While a lime/oil dispersion can be employed to absorb the moisture, leaving only a small amount of included air to cause porosity, it would be a considerable advantage over present methods to be able to prevent the air porosity from occurring, as this is unacceptable in applications such as cables (see British Pat. No. 1,012,562) where a very solid rubber insulation is required to ensure electrical safety.

It is also extremely difficult to ensure that unwanted porosity is avoided in extruded articles which contain reinforcing fabrics, such as hose. In these cases air is entrapped in the interstices of the reinforcing fabric, and expands rapidly under ambient pressure/high temperature conditions causing porosity, blistering, and separation of the reinforcement from the rubber.

According to the present invention, a method of curing materials such as rubber comprises placing the liquid vulcanising or curing medium (which may be either a true liquid or a fluidised bed "psuedoliquid") within a closed vessel and applying to the vessel a pressure sufficient to prevent substantial expansion of the air, moisture or other volatiles or gases present in the article or material being cured.

The invention includes apparatus for carrying out this method, and comprising:

1. An essentially closed vessel for holding a vulcanising or curing medium;
2. Means for maintaining within the vessel a positive gas pressure sufficient to prevent substantial expansion of air, moisture or other volatiles or gases present in the material to be cured;
3. Entry and exit means for passing material to be cured through said vessel; and
4. Means to prevent or minimise escape of gas under pressure from within the vessel at the points of entry and exit of the material to be cured.

In the case of a vulcanising medium consisting of a hot liquid, for example, the pressure may be applied by a gas pressure line, via a pressure reducing valve rated or set to compensate for losses of the pressurising gas through the entry and/or exit seals by which the continuous rubber article enters and leaves the pressurised vessel. Where the liquid is reactive, for example if it is a mixture of reactive salts, it is preferred in the interests of safety to use an inert gas as the pressurising gas.

In the case of a fluidised bed "pseudoliquid", the fluidising gas and the pressurising gas may conveniently be the same gas. In this case it is essential that the gas continues to flow through the fluidising apparatus at the appropriate rate to maintain the fluidisation, so the pressure may be controlled by placing an adjustable pressure relief valve in a gas exit from the apparatus. This valve can be adjusted to "blow off" at a predetermined required pressure. For example, a fluidised bed enclosed in a vessel may be fed with steam as the pressurising and fluidising gas. The source of steam may be a conventional high pressure steam line such as is available in many rubber factories. The steam may be fed through a pressure reducing valve to a superheater, where it is heated to the required temperature, and then supplied to the fluidised bed, being allowed, for example, to enter the bed via a layer of porous tiles on which rests the medium to be fluidised. The steam passes through the particles of the medium, causing them to become fluidised, into the part of the closed vessel above the medium, and finally leaves the vessel by the pressure relief valve.

In general, the gas used to fluidise and pressurise the bed may be air or steam or an inert gas. Steam has been considered to be desirable only because in the superheated condition it is a cheap, readily available, dry inert gas. For a large proportion of curable materials air would be more satisfactory if available at high volumes and pressures.

As the closed vessel containing the vulcanising medium is maintained internally at a pressure in excess of ambient pressure, for example, a pressure between 20 and 80 p.s.i., it is necessary to pass the rubber extrusion to be vulcanised through entry and exit sealing glands to prevent excessive loss of the pressurising gas. The sealing is particularly easy in the case of hose and cable extrusions since these are of circular cross section and can be sealed, e.g. by seals of the type conventionally used in sealing cables at the exit from high pressure steam tubes as conventionally used for curing cables. In the case of hose, the sealing is more effective if the hose is supported internally by a flexible mandrel (as described, for example, in U.S. Pat. No. 2,974,713).

It is more difficult to arrange entry sealing than exit sealing, since the rubber before vulcanisation is soft and liable to flow. While this is no great problem with supported and reinforced extrusions of simple (e.g. circular) cross section, it is nevertheless an advantage to be able to dispense with the entry sealing gland. With more complicated cross sections, such as weather-stripping for building and car applications, sealing the soft unvulcanised article into the pressurised vessel is difficult. It is therefore proposed that the pressurised vessel may be clamped directly to the extruder, so that the extruder die delivers the extrusion directly into the vessel, and an entry seal is unnecessary. To arrange an exit seal is not difficult, since at the exit the rubber is cured, resilient, and amenable to sealing.

The invention will now be further described by way of example, with reference to the accompanying drawings which show a form of apparatus which may be used for the continuous vulcanisation of rubber extrusions using a fluidised bed curing medium, and operating at pressures of about 20 to 80 p.s.i.

FIG. 1 shows a side elevation of such an apparatus;

FIG. 2 shows a cross section of the same apparatus on the line 2—2 of FIG. 1;

FIG. 3 shows the particularly advantageous circulation pattern of fluidised particles in such an apparatus; and FIG. 4 is a modification of part of the apparatus shown in FIG. 1.

Referring to FIGS. 1 and 2, a closed vessel in the form of a main tube 1 in unit lengths is supported on wheeled stands 2. The stands 2 also support unit lengths of a feed pipe 3 which is connected by branch pipes 4 through fluidising inlet ports 5 in the base of the tube 1 with the interior of tubular porous tiles 6 mounted within the tube 1. The tube 1 is also provided with internal heaters 7 and external muff heaters 8. The upper part of the main tube 1 communicates with an exhaust pipe 9 which terminates in a pressure relief valve 10 and is supported on the tube 1. The pipe 9 is also in unit lengths.

Each wheeled stand 2 and the length of pipe 1 which it carries constitutes a unit and any number of these units may be coupled together as shown in the drawings to form a continuous length of main tube 1. For this purpose, the main tube lengths 1 are bolted together with suitable sealing and the lengths of feed pipe 3 are likewise bolted and sealed. The lengths of exhaust tube 9 are coupled together by means of a flexible bellows 11 to allow for misalignments, and differential expansions when the apparatus is heated. The wheeled stands may also support temperature control units.

The main tube 1 is also provided with filling and viewing ports 12, and with drain plugs 13 for maintenance purposes. The ends of the main tube 1 are provided with telescopic seals 14 to allow rubber extrudate or other material to be cured to pass into and out of the main tube 1.

On its inlet side, the feed pipe 3 includes a pressure reducing valve 15 which is followed by a superheater 16.

In use, the main tube 1 is filled to approximately 2 inches above the centreline with the ballotini (tiny glass spheres) to be fluidised, the tube being approximately 8 inches in diameter. The fluidising steam is derived from the normal high pressure factory shop line and is first reduced in pressure by the valve 15 and then superheated to the temperature required at 16. Typical operating temperatures and pressures in the main tube 1 are 180° to 250°C. at 20 to 50 p.s.i. The steam is fed to each bed section by feed pipe 3 through the fluidising inlet ports 5 into the centre of the porous tiles 6. Steam escapes from the porous tiles into the ballotini, the steam velocity being high enough to ensure that the ballotini is fluidised.

The fluidised ballotini is heated by the internal heaters 7 and external heat losses are prevented by the external muff heaters 8. The internal heaters 7 may also act as baffles and are preferably situated above the porous tiles 6 and offset from the centreline of the tiles. This preferred construction causes a recirculating pattern of movement to be set up in the ballotini as shown in FIG. 3. There are two main advantages in this recirculating pattern. Firstly, it gives very good heat scavenging from the heater surface and distributes this heat quickly and evenly throughout the ballotini. Secondly, it gives a natural tendency for any rubber extrudate floating in the bed to travel down the centre, thus tending to prevent the snaking that occurs in the ordinary fluid bed using plain porous tiles and a rectangular cross-sectional bed. The extrudate, while still floating, is made to sit lower in the fluidised ballotini, thus giving better and more uniform heating.

The steam which has passed through the ballotini passes through the exhaust pipe 9 to the pressure relief valve 10 and is then either exhausted to atmosphere or cooled and passed into the normal condensate line. The back pressure in the main tube is controlled by the pressure relief valve. In places of steam, air may be used.

In order to reduce the volume of fluidising gas required to be supplied to the apparatus provision may be made to recirculate the gas. Gas may be taken from the exhaust pipe 9 via a suitable filter to a rotary blower capable of producing a pressure differential greater than the pressure drop across the system from feed pipe 3 to exhaust pipe 9. Thus the large volume flow of gas required to cause adequate fluidisation may be provided by the rotary blower while the pressure and losses via seals and relief valve 10 would be provided via the feed pipe 3 from the normal factory air or steam line.

The rubber extrudate or other material to be cured passes in and out of the bed through the telescopic seals 14, the design of which depends on the nature of the extrudate and the internal pressure in the main tube. They are telescopic in part in order to facilitate the initial feeding of extrudate through the bed. The feed end may be bolted directly to the extruder, thus eliminating sealing problems at the point where the extrudate is soft and easily distorted.

For circular cross section extrusions such as hose or cable one type of seal may take the form of a tube 17 of rubber or suitable resilient material as shown in FIG. 4. This may be supported such that the diameter of the hole through the tube is greater at either end than at the centre, the centre diameter being smaller than the extrusion to be produced. The whole tube may be mounted in a case 18 with the ends of the tube sealed to the case and the cavity between the case and the outer wall of the rubber tube filled with liquid (e.g. glycerine via an inlet 19). The volume of this cavity may be varied by means of a plunger 20 slidable in the casing so that the centre diameter of the sleeve will also be varied and can be adjusted to be a close fit on the extrusion thus controlling the quantity of gas escaping through the seal.

The position of this plunger may be adjusted manually or may be controlled by the pressure in the bed (vessel 1) via a pipe 21 provided with a regulator 22 as shown in FIG. 4. If therefore the gap between the seal and the extrusion became too large the pressure in the bed would fall. This fall of pressure may be made to move the plunger in such a direction as to reduce the centre diameter of the rubber tube thus reducing the gap between seal and extrusion.

Tubular sections have been used throughout as being the best shape suitable for a pressurised vessel.

The use of two tubular porous tile units for fluidising in place of the standard fluid bed flat tile offers certain advantages. There are less problems involved in sealing the tiles together and more reliable performance can be expected. The recirculating pattern obtained gives improved heat distribution and induces the rubber to travel up the centre of the bed. Finally, the tiles are easily removable for maintenance.

In general, the fluidising apparatus of the invention comprises a closed vessel for the fluidising medium, means to supply a fluidising gas to the fluidising medium, means to withdraw from the closed vessel fluidising gas after it has passed through the fluidising medium and means to maintain a predetermined pressure within the closed vessel.

While the invention has been described primarily with respect to the curing of rubber, it will be appreciated that it may also be used for curing other polymers which can be subjected to heat treatment to cause a cross linking reaction, such as curable plastics. A particular example of a curable plastic which may be employed is polyethylene containing a peroxide or other cross linking agent.

We claim:
1. Apparatus for curing curable elastomeric materials comprising:
   1. An essentially closed vessel for holding a fluidisable bed curing medium;
   2. Means arranged to fluidise said bed when in said vessel, said means being also arranged to maintain within the vessel a positive gas pressure sufficient to prevent substantial expansion of volatiles or gases present in the elastomeric material to be cured;
   3. Entry and exit means for passing material to be cured continuously through said vessel; and
   4. Means to prevent or minimize escape of gas under pressure from within the vessel at the points of entry and exit of the material to be cured.

2. Apparatus as claimed in claim 1 in which the entry and exit means comprise seals.

3. Apparatus as claimed in claim 1 in which the means for maintaining the positive pressure within the vessel comprise a gas pressure line for supplying pressurising gas to said vessel, the gas pressure line including a pressure reducing valve set to compensate for losses of the pressurising gas.

4. Apparatus as claimed in claim 3 in which an adjustable pressure relief valve is provided in a gas exit from the closed vessel.

5. Apparatus as claimed in claim 1 in which means are provided to heat the contents of the closed vessel.

6. Apparatus as claimed in claim 3 in which the gas pressure line communicates with the interior of the closed vessel through a porous material on or around which material to be fluidised may be disposed.

7. Apparatus as claimed in claim 6 in which the porous material takes the form of at least one tubular porous tile.

8. Apparatus as claimed in claim 1 in which the entry or exit means take the form of a tube of resilient material having a constriction between the ends thereof and means are provided to apply pressure to the outside of the tube in order to adjust the size of the constriction.

9. Apparatus as claimed in claim 8 in which the means for adjusting the size of the constriction are controllable by the gas pressure within the closed vessel.

10. Apparatus as claimed in claim 1 in which an extruder is directly connected at its output end to the entry means of the closed vessel.